(12) United States Patent
Tsuji et al.

(10) Patent No.: US 10,828,759 B2
(45) Date of Patent: Nov. 10, 2020

(54) TENSIONING DEVICE

(71) Applicant: TOHNICHI MFG. CO., LTD., Tokyo (JP)

(72) Inventors: Hiroshi Tsuji, Tokyo (JP); Kyoichi Komatsu, Tokyo (JP); Osamu Tsuji, Tokyo (JP); Seiji Ito, Tokyo (JP)

(73) Assignee: TOHNICHI MFG. CO., LTD., Tokyo (JP)

( * ) Notice: Subject to any disclaimer, the term of this patent is extended or adjusted under 35 U.S.C. 154(b) by 0 days.

(21) Appl. No.: 16/480,171

(22) PCT Filed: Oct. 10, 2018

(86) PCT No.: PCT/JP2018/037741
§ 371 (c)(1),
(2) Date: Jul. 23, 2019

(87) PCT Pub. No.: WO2019/167326
PCT Pub. Date: Sep. 6, 2019

(65) Prior Publication Data
US 2020/0171636 A1 Jun. 4, 2020

(30) Foreign Application Priority Data
Feb. 28, 2018 (JP) ................. 2018-035402

(51) Int. Cl.
*B25B 29/02* (2006.01)
*F16B 35/06* (2006.01)

(52) U.S. Cl.
CPC .............. *B25B 29/02* (2013.01); *F16B 35/06* (2013.01)

(58) Field of Classification Search
CPC . B25B 29/02; F16B 35/06; G01L 5/24; G01L 5/0033
See application file for complete search history.

(56) References Cited

U.S. PATENT DOCUMENTS 9,188,146 B1 * 11/2015 Trautman ................ B25B 29/02
9,248,532 B2 * 2/2016 Wagner ................... B25B 29/02
(Continued)

FOREIGN PATENT DOCUMENTS

CN 2597974 Y 1/2004
CN 201852663 U 6/2011
(Continued)

OTHER PUBLICATIONS

PCT/ISA/210, "International Search Report for International Application No. PCT/JP2018/037741," dated Jan. 8, 2019.
(Continued)

*Primary Examiner* — David B. Thomas
(74) *Attorney, Agent, or Firm* — Manabu Kanesaka

(57) ABSTRACT

To provide a tensioning device capable of tensioning a bolt from a bolt head side while suppressing increase in the number of components. A tensioning device is configured to apply upward tension to a bolt fastened to a fastened member H. A first male thread portion is formed on an outer circumferential surface of a head of the bolt. The tensioning device includes a connection member having a first female thread portion to be threadly engaged with the first male thread portion, a tensioning mechanism for tensioning the bolt via the connection member in a state where the first male thread portion is threadly engaged with the first female thread portion, and a tension bearer which is disposed around an outer circumference of the connection member, and bears a reaction force applied from the fastened member H in tensioning performed by the tensioning mechanism.

11 Claims, 12 Drawing Sheets

(56) References Cited

U.S. PATENT DOCUMENTS

| | | | |
|---|---|---|---|
| 9,289,888 B2* | 3/2016 | Kastner | B23P 19/067 |
| 9,381,632 B2* | 7/2016 | Hohmann | B25B 23/0064 |
| 9,506,492 B2* | 11/2016 | Trautman | B25B 29/02 |
| 9,744,656 B2* | 8/2017 | Hohmann | B25B 29/02 |
| 9,878,430 B2* | 1/2018 | Hohmann | B25B 29/02 |
| 9,981,369 B2* | 5/2018 | Hohmann | B23P 19/067 |
| 10,173,309 B2* | 1/2019 | Jaeger | B25B 29/02 |
| 10,239,194 B2* | 3/2019 | Hohmann | B25B 29/02 |
| 10,252,405 B2* | 4/2019 | Bartels | B25B 29/02 |
| 10,322,478 B2* | 6/2019 | Hohmann | B23P 19/067 |
| 10,364,835 B2* | 7/2019 | Trautman | B25B 29/02 |
| 10,569,401 B2* | 2/2020 | Ribault | B23P 19/067 |
| 2003/0183045 A1 | 10/2003 | Junkers | |
| 2009/0084197 A1 | 4/2009 | Lohr | |
| 2009/0092459 A1 | 4/2009 | Daly | |
| 2009/0147429 A1 | 6/2009 | Martin Hernandez | |
| 2014/0241829 A1 | 8/2014 | Chiba et al. | |
| 2016/0297057 A1* | 10/2016 | Ribault | B25B 29/02 |
| 2018/0215022 A1* | 8/2018 | Guisasola | B25B 29/02 |
| 2019/0061075 A1* | 2/2019 | Hohmann | B25B 23/1456 |

FOREIGN PATENT DOCUMENTS

| | | |
|---|---|---|
| CN | 202562687 U | 11/2012 |
| CN | 202793666 U | 3/2013 |
| CN | 103245452 A | 8/2013 |
| CN | 203259287 U | 10/2013 |
| CN | 203670410 U | 6/2014 |
| CN | 204286667 U | 4/2015 |
| CN | 205175603 U | 4/2016 |
| CN | 206756360 U | 12/2017 |
| DE | 202016103028 U1 | 9/2017 |
| JP | H01-026013 A | 1/1989 |
| JP | H04-084821 U | 7/1992 |
| JP | H08-166299 A | 6/1996 |
| JP | H10-170362 A | 6/1998 |
| JP | 2006-337058 A | 12/2006 |
| JP | 4028254 B2 | 12/2007 |
| JP | 2011-021989 A | 2/2011 |
| JP | 2013-194888 A | 9/2013 |
| JP | 2014-149043 A | 8/2014 |
| TW | 200401083 A | 1/2004 |
| TW | 200809096 A | 2/2008 |
| TW | 201329253 A | 7/2013 |

OTHER PUBLICATIONS

Japan Patent Office, "Office Action for Japanese Patent Application No. 2018-035402," dated Apr. 24, 2018.
China Patent Office, "Office Action for Chinese Patent Application No. 201880009242.3," dated Apr. 17, 2020.

* cited by examiner

TENSIONING DEVICE

RELATED APPLICATIONS

The present application is National Phase of International Application No. PCT/JP2018/037741 filed Oct. 10, 2018, and claims priority from Japanese Application No. 2018-035402, filed Feb. 28, 2018, the disclosure of which is hereby incorporated by reference herein in its entirety.

TECHNICAL FIELD

The present invention relates to a tensioning device which applies tension upwardly to a bolt fastened to a fastened member.

BACKGROUND ART

Machines such as automobiles, and structures such as bridges are assembled through fastening with screws. The strength of the screw as the fastener largely relies on the tightening force. Meanwhile, monitoring of the fastening force applied to the bolt fasteners is performed by measuring the torque and the rotation only during tightening of them. After the tightening, there are seldom chances of controlling the tightening force. However, there may cause the bolt to be loosened owing to unexpected external force in operation of the machine to lower the tightening force. This may considerably increase the risk of fatigue fracture. It is therefore necessary to pay attention to detection of the tightening force applied to the fastened bolt in order to prevent the rupture accident of the bolt, and improve reliability of the screw fastener.

Patent Literature 1 discloses the method of detecting tightening force of a bolt-nut fastener, the bolt-nut fastener being configured so that the bolt is inserted into an insertion hole of a fastened member and the nut is threadly engaged with the male thread portion of the bolt inserted into the insertion hole for fastening the fastened member to be clamped therebetween, wherein the male thread portion of the bolt protruding from the upper surface is subjected to tension to detect the transition point of the spring constant of the bolt, and the tension force at the transition point is determined as the tightening force.

CITATION LIST

Patent Literature

Patent Literature 1: Japanese Patent No. 4028254

SUMMARY OF INVENTION

Technical Problem

However, the tightening force detection method as disclosed in Patent Literature 1 is assumed to be implemented by tensioning the male thread portion of the bolt, which protrudes from the upper surface of the nut. The axial force detection from the head side of the bolt has never been considered.

It is an object of the present invention to provide the tensioning device capable of tensioning the bolt from the bolt head side.

Solution to Problem

In order to solve the above-described problem, the invention provides:

(1) A tensioning device which applies upward tension to a bolt fastened to a fastened member, having a first male thread portion formed on an outer circumferential surface of a head of the bolt. The tensioning device includes a connection member having a first female thread portion to be threadly engaged with the first male thread portion, a tensioning mechanism which tensions the bolt via the connection member while having the first male thread portion threadly engaged with the first female thread portion, and a tension bearer which is disposed around an outer circumference of the connection member, and bears a reaction force applied from the fastened member in tensioning performed by the tensioning mechanism.

(2) In the tensioning device according to the above-described (1), the tensioning mechanism includes a tension rod, a bearing which rotatably supports the tension rod around a vertically extending shaft portion, and a rotation mechanism serving to rotate the tension rod around the shaft portion. A convex portion having a second male thread portion formed on an outer circumferential surface is disposed on an upper end of the contact member. A hollow portion having a second female thread portion to be threadly engaged with the second male thread portion on an inner circumferential surface is formed in a lower end of the tension rod.

(3) In the tensioning device according to the above-described (2), the tension bearer is vertically interposed between the bearing and the fastened member.

(4) In the tensioning device according to the above-described (2) or (3), the convex portion has an axial diameter which is substantially the same as that of the bolt, and a friction torque reducing agent for reducing a friction torque is applied to the second male thread portion and the second female thread portion.

(5) In the tensioning device according to any one of the above-described (1) to (4), a tensile strength of the connection member is higher than that of the bolt.

(6) In the tensioning device according to any one of the above-described (1) to (5), the bolt is a hexagon head bolt, having the first male thread portion formed on a bending shape portion of an outer circumferential surface of a head of the bolt.

(7) In the tensioning device according to the above-described (6), the following relational expressions (1) and/or (2) are satisfied:

$$D1 > S \times 1.03 \tag{1}$$

$$D2 < S \times 1.10 \tag{2}$$

where S denotes a width across flat of a head of the bolt, D1 denotes an outer diameter of a male thread of the first male thread portion, and D2 denotes a bottom diameter of a male thread of the first male thread portion.

(8) In the tensioning device according to any one of the above-described (1) to (5), the bolt is a hexagon socket bolt, having the first male thread portion continuously formed on an outer circumferential surface of a head of the bolt.

(9) In the tensioning device according to any one of the above-described (1) to (5), the bolt is a square head bolt, having the first male thread portion formed on a bending shape portion of an outer circumferential surface of a head of the bolt.

(10) In the tensioning device according to the above-described (9), the following relational expressions (3) and/or (4) are satisfied:

$$D1 > S \times 1.03 \quad (3)$$

$$D2 < S \times 1.32 \quad (4)$$

where S denotes a width across flat of a head of the bolt, D1 denotes an outer diameter of a male thread of the first male thread portion, and D2 denotes a bottom diameter of a male thread of the first male thread portion.

(11) In the tensioning device according to any one of the above-described (1) to (5), the bolt is a dodecagon head bolt, having the first male thread portion formed on a bending shape portion of an outer circumferential surface of a head of the bolt.

(12) In the tensioning device according to the above-described (11), the following relational expressions (5) and/or (6) are satisfied:

$$D1 > S \times 1.04 \quad (5)$$

$$D2 < S \times 1.13 \quad (6)$$

where S denotes a width across flat of a head of the bolt, D1 denotes an outer diameter of a male thread of the first male thread portion, and D2 denotes a bottom diameter of a male thread of the first male thread portion.

(13) In the tensioning device according to any one of the above-described (1) to (5), the bolt is a flange bolt having a bolt head including a head main body and a flange, and the first male thread portion is formed on at least one of the head main body and the flange.

(14) In the tensioning device according to the above-described (1) or (2), a protection plate intervenes between the tension bearer and the fastened member in tensioning performed by the tensioning mechanism.

(15) In the tensioning device according to the above-described (14), a contact area of the protection plate with the fastened member is adjusted so that a deformation amount S1 of the fastened member just below a head of the bolt before starting tensioning by the tensioning mechanism is substantially equalized to a deformation amount S2 of the fastened member just below the protection plate after starting tensioning by the tensioning mechanism.

(16) In the tensioning device according to the above-described (1) or (2), a contact area of the tension bearer with the fastened member is adjusted so that a deformation amount S1 of the fastened member just below a head of the bolt before starting tensioning by the tensioning mechanism is substantially equalized to a deformation amount S2 of the fastened member just below the tension bearer after starting tensioning by the tensioning mechanism.

Advantageous Effects of Invention

According to the present invention, the female thread portion of the tensioning device is threadly engaged with the male thread portion formed on a side surface of the bolt head so that the bolt is tensioned. This makes it possible to tension the bolt from the bolt head side.

DESCRIPTION OF EMBODIMENTS

Figure 1:
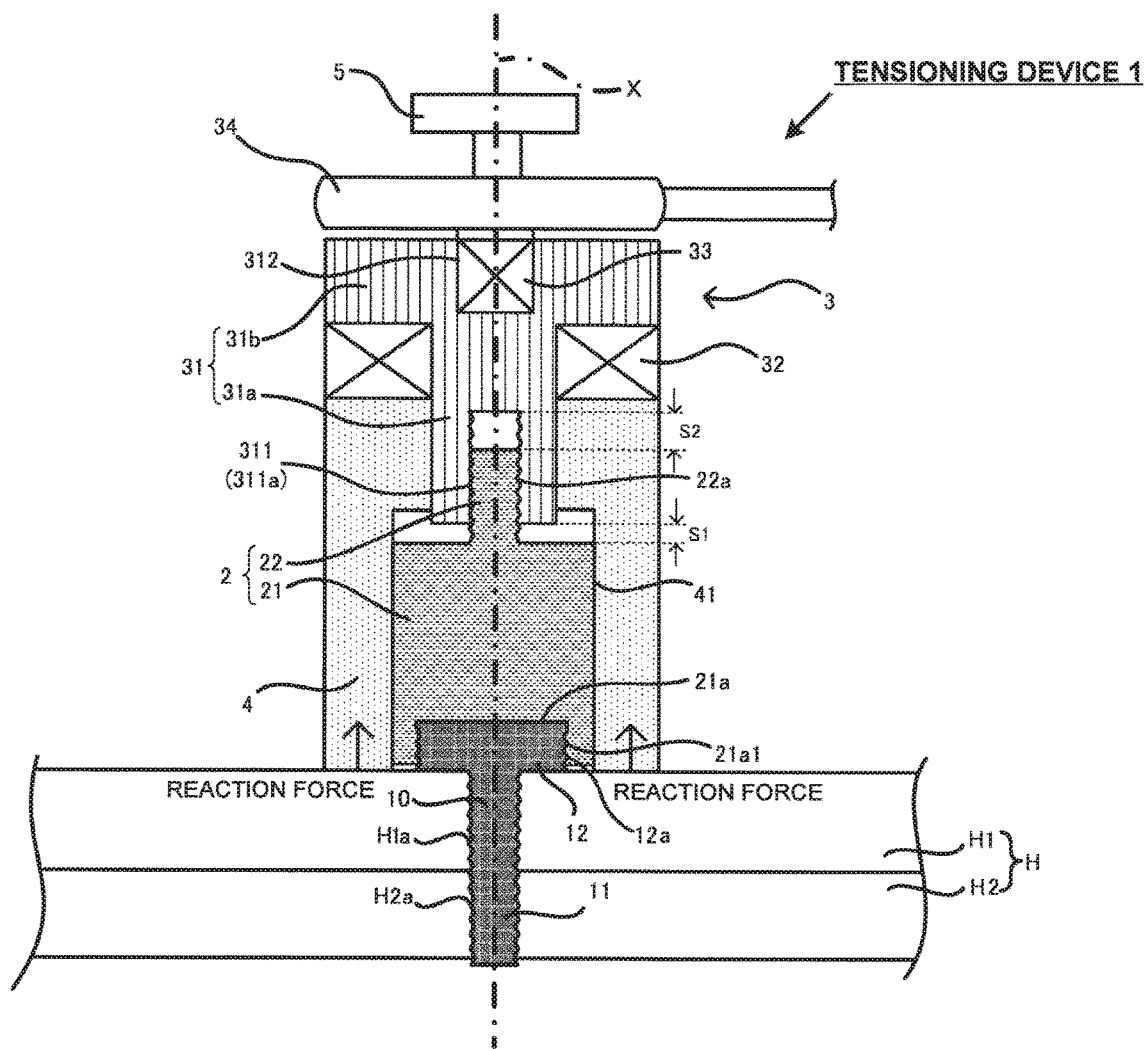
FIG. 1 is a schematic view of a tensioning device.

Embodiments of the present invention will be described referring to the drawings.

First Embodiment

A tensioning device of this embodiment serves to fasten a fastened member with a bolt fastener, and applies tension to the bolt while holding the upper surface of the fastened member. The tensioning device is used for detection of the axial force of the bolt (in other words, fastening force of the bolt), and detection of the spring constant of the fastened member to which the bolt is fastened. The basic concept of the axial force detection is similar to the one disclosed in Japanese Patent No. 4028254. In the following embodiments, structures and operations of the tensioning devices will be described by taking the axial force detection as an example.

Figure 2A:
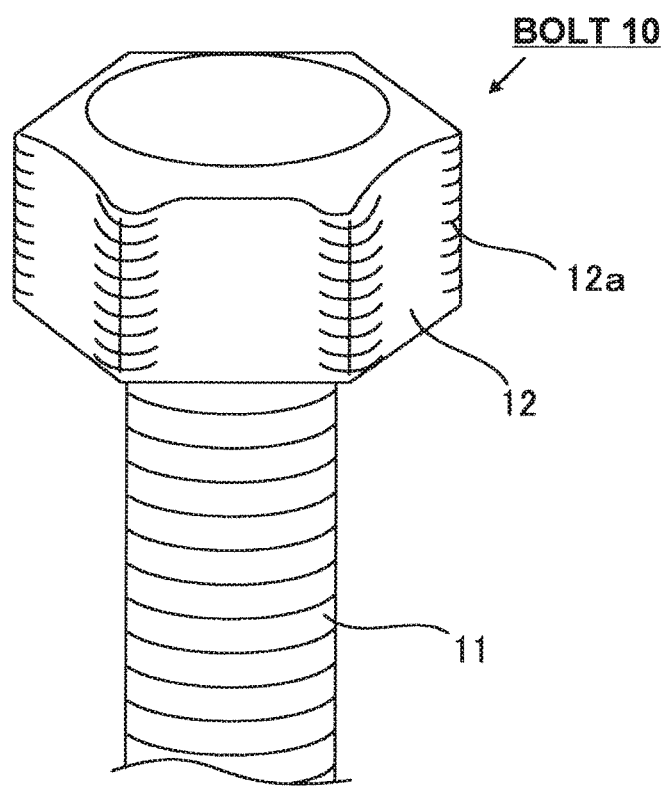
FIG. 2(a) is a perspective view of a bolt.

FIG. 1 is a schematic view of a tensioning device of the embodiment in the state just after starting tensioning the bolt. A plurality of members constituting the tensioning device are marked with mutually different hatchings so as to clarify each boundary among those members. FIG. 2(a) is a perspective view of the bolt. A tensioning device 1 includes a connection member 2, a tensioning mechanism 3, a tension bearer 4, and a handle 5. A vertically extending rotation axis X of the tensioning device 1 is indicated by an alternate long and short dashed line.

The connection member 2 includes a column portion 21 and a convex portion 22 formed on an upper surface of the column portion 21. A vertically extending connection member hollow portion 21a is formed in a lower end of the column portion 21. A first female thread portion 21a1 extending around the rotation axis X is formed on a circumferential surface of the connection member hollow portion 21a. The convex portion 22 is formed to have a column shape with a diameter smaller than that of the column portion 21. A second male thread portion 22a extending around the rotation axis X is formed on the outer circumferential surface of the convex portion. The connection member 2 may be made of a material with higher tensile strength than the bolt 10. This makes it possible to prevent plastic deformation of the connection member 2 in the axial force detection.

The tensioning mechanism 3 includes a tension rod 31, a bearing 32, an angle drive 33 (corresponding to a rotation mechanism), and a wrench 34 (corresponding to a rotation mechanism). The tension rod 31 includes a columnar small-diameter rod portion 31a and a columnar large-diameter rod portion 31b. An upper end portion of the small-diameter rod portion 31a and a lower end portion of the large-diameter rod portion 31b are connected to each other. The small-diameter rod portion 31a and the large-diameter rod portion 31b are integrally formed.

A tension rod hollow portion 311 is formed in a lower end of the small-diameter rod portion 31a. A second female thread portion 311a extending around the rotation axis X is formed on an inner circumferential surface of the tension rod hollow portion 311. A mount opening 312 is formed in an upper end of the large-diameter rod portion 31b.

The bearing 32 is formed as a thrust bearing for rotatably supporting the small-diameter rod portion 31a of the tension rod 31. An upper end surface of the bearing 32 comes in contact with the large-diameter rod portion 31b of the tension rod 31. A lower end surface of the bearing 32 comes in contact with an upper end surface of the tension bearer 4. That is, the bearing 32 is vertically interposed between the large-diameter rod portion 31b and the tension bearer 4.

The angle drive 33 is detachably fitted with the mount opening 312 of the large-diameter rod portion 31b. Rotating the angle drive 33 allows the tension rod 31 to rotate around the rotation axis X. The angle drive 33 may be rotated using the handle 5 and the wrench 34. The embodiment is structured so that the connection member 2 moves up by the amount corresponding to the thread pitch of the second female thread portion 311a of the tension rod 31 upon a single round rotation of the tension rod 31 around the rotation axis X using the wrench 34. In the embodiment, the tension rod 31 is rotated using the angle drive 33, the handle 5, and the wrench 34. The present invention is not limited to the above-described example. It is possible to use any other drive means capable of generating power for rotating the tension rod 31.

The wrench 34 is a horizontally long shaped so as to generate the torque larger than the one generated by the handle 5 in rotation with the same force. The wrench 34 includes a not shown angle sensor (gyro sensor, for example). The angle sensor allows measurement of the rotation amount of the tension rod 31. It is possible to attach the angle sensor directly to the tension rod 31 instead of the wrench 34.

The tension bearer 4 includes a not shown axial force detection unit for detecting the axial force. For example, a strain gauge may be used as the axial force detection unit. The strain gauge is deformed by the force applied thereto, and outputs an electrical signal in accordance with the amount of deformation. A vertically extending tension hollow portion 41 is formed in a lower end of the tension bearer 4. The connection member 2 is stored in the tension hollow portion 41. The column portion 21 of the connection member 2 is disposed along the inner circumferential surface of the tension hollow portion 41. In other words, the tension bearer 4 is disposed to surround the connection member 2.

The structure of the tensioning mechanism 3 is not limited to the above-described example. Any other structure is available so long as the connection member 2 and the bolt 10 can be moved up without being rotated. For example, a concave portion with the female thread on its inner circumferential surface is formed in the upper surface of the column portion 21, and a convex portion with the male thread on its outer circumferential surface is formed on the lower end of the tension rod 31 (that is, the lower end of the small-diameter rod portion 31a). The convex portion is then threadly engaged with the female thread so as to apply tension to the connection member 2 and the bolt 10. It is possible to detect the axial force by hydraulically measuring the tension force and the vertical displacement instead of the rotating operation performed by the tension rod 31.

A detailed explanation will be made with respect to the bolt and the fastened member. The bolt 10 as a hexagon head bolt includes a bolt shaft 11 and a bolt head 12. The bolt shaft 11 has a male thread formed thereon. The fastened member H includes the fastened body H1 and a fastened body H2, which are vertically stacked. The fastened bodies H1 and H2 have bolt holes H1a and H2a, respectively. A female thread portion to be threadly engaged with the male thread portion of the bolt shaft 11 is formed on a circumferential surface of the bolt hole H2a. The bolt 10 inserted into the bolt hole H1a is threadly engaged with the bolt hole H2a so that the bolt 10 is fastened to the fastened member H.

Alternatively, the bolt 10 may be fastened to the fastened member H in the following manner. The bolt hole H2a has no female thread portion. The bolt 10 is inserted into the bolt holes H1a and H2a so that a not shown nut is threadly engaged with the bolt shaft 11 which protrudes downward from the end surface of the fastened member H (H2). Arbitrary kinds of nut may be employed in no restricted manner, for example, the hexagonal nut, the dodecagonal nut, and the square nut may be used (this applies to other embodiments and modified examples).

Figure 2B:
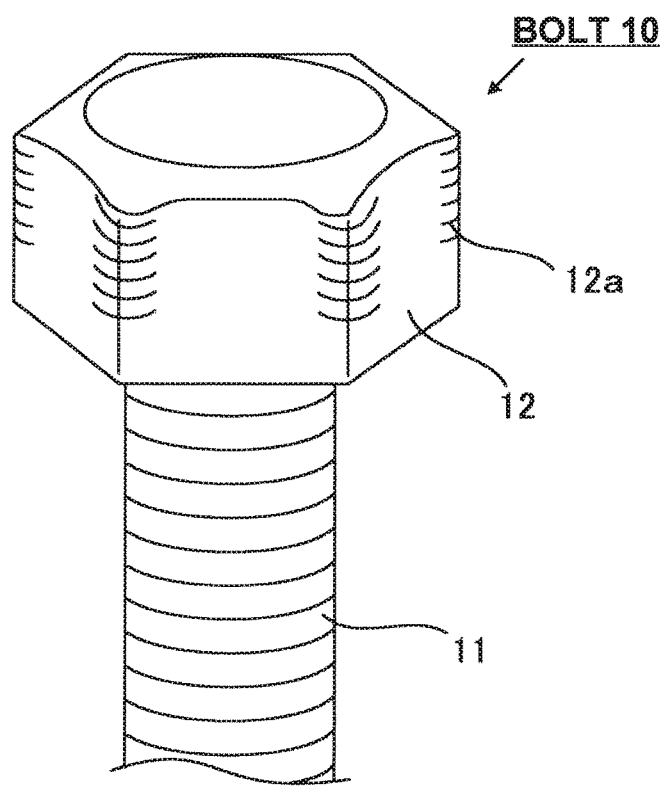
FIG. 2(b) is a perspective view of a bolt (modified example of first embodiment).

As FIG. 2(a) shows, first male thread portions 12a are formed on a side surface of the bolt head 12 in a circumferential direction at intervals. That is, each of the first male thread portions 12a is formed into a bending shape portion on the side surface of the bolt head 12. In the illustrated example, the first male thread portion 12a is formed entirely across the side surface of the bolt head 12 from the upper end to the lower end. However, the present invention is not limited to the example. The first male thread portion may be formed on a part of the side surface from the upper end to the lower end as shown in FIG. 2(b).

Assuming that a width across flat of the bolt head 12 is defined as S, an "outer diameter of a male thread" of the first male thread portion 12a of the bolt head 12 is defined as D1, and a "bottom diameter of a male thread" of the first male thread portion 12a of the bolt head 12 is defined as D2, it is preferable to satisfy the following relational expressions (1) and/or (2). The width across flat denotes the inter-axial distance between two opposite sides of the bolt head 12 (this applies to other embodiments and modified examples).

$$D1 > S \times 1.03 \quad (1)$$

$$D2 < S \times 1.10 \quad (2)$$

By satisfying the relational expression (1), engagement of the fastening tool with the bolt head 12 may be improved when fastening the bolt 10 to the fastened member H. By satisfying the relational expression (2), engagement of the first male thread portion 12a with the first female thread portion 21a1 of the connection member 2 may be improved when tensioning the bolt 10 with the connection member 2.

The friction torque of the bolt 10 exerted to the fastened member H is set to be larger than that of the connection member 2 exerted to the tension rod 31. That is, the friction torque between the male thread portion of the bolt shaft 11 and the female thread portion of the bolt hole H2a, which are in the fastened state is larger than the friction torque between the second male thread portion 22a of the convex portion 22 and the second female thread portion 311a of the tension rod 31, which are in the threadly engaged state. This makes it possible to prevent rotation of the bolt 10 in the axial force detection.

In the embodiment, in order to establish the above-described correlation between two different friction torques, each diameter dimension of the bolt shaft 11 and the convex portion 22 is set to be substantially equalized, and the friction torque of the convex portion 22 to the second female thread portion 311a of the tension rod 31 is reduced by applying the lubricant (corresponding to the friction torque reducing agent). There may be another method of reducing the friction torque in which the diameter of the convex portion 22 is set to be smaller than that of the bolt shaft 11. However, if the diameter of the convex portion 22 becomes smaller, the stress resultant from tensioning is increased to cause the risk of damage to the convex portion 22. In this embodiment, the correlation between the different friction torques may be established by substantially equalizing the diameter dimensions of the bolt shaft 11 and the convex portion 22, and reducing the friction torque between the convex portion 22 and the tension rod 31 using the lubricant.

Operations of the tensioning device 1 in the axial force detection will be described on the assumption that the bolt 10 is fastened to the fastened member H in the initial state. It is also assumed that the tensioning mechanism 3, the tension bearer 4, and the handle 5 are preliminarily assembled to be unitized.

Firstly, the first male thread portion 12a of the bolt head 12 is threadly engaged with the first female thread portion 21a1 of the connection member 2 for connection between the connection member 2 and the bolt 10. That is, the threaded advancement is made to reach the position at which the upper surface of the bolt head 12 abuts on the ceiling surface of the connection member hollow portion 21a for mutual threaded engagement between the connection member 2 and the bolt 10.

Predetermined tensioning start conditions have to be satisfied for starting tensioning by threadly engaging the first male thread portion 12a and the first female thread portion 21a1. Followings are the predetermined tensioning start conditions (1) and (2).

(Condition 1): The first female thread portion 21a1 is threadly engaged with the first male thread portion 12a with its length equal to or longer than the single-round of the outer circumferential surface of the bolt head 12.
(Condition 2): A clearance is formed between the lower end of the connection member 2 and the fastened body H1.

Failing to satisfy the condition 1 causes the bolt head 12 to have the region where no tensile force is applied in the circumferential direction (in other words, the region which does not abut on the first female thread portion 21a1). As a result, the load is exerted in the direction different from the tensioning direction (that is, vertical direction), resulting in the risk of deteriorating accuracy of the axial force detection. Failing to satisfy the condition 1 also causes plastic deformation of the thread ridge in tensioning, resulting in the risk of deteriorating accuracy of detection such as the axial force detection.

Failing to satisfy the condition 2 may increase the detection error because the axial force is detected in the pressure contact state between the lower end of the connection member 2 and the fastened body H1.

When the connection member 2 is rotated around the rotation axis X so as to threadly engage the first male thread portion 12a and the first female thread portion 21a1 for connection between the connection member 2 and the bolt head 12, the connection member 2 will threadly advance downwardly. Further rotation of the connection member 2 around the rotation axis X brings the bolt head 12 into abutment on the ceiling surface of the connection member hollow portion 21a. As a result, the connection member 2 is no longer rotatable. In the embodiment, the size of the connection member hollow portion 21a is set to satisfy the conditions 1 and 2 in abutment of the connection member hollow portion 21a on the bolt head 12 (in other words, when the connection member 2 becomes no longer threadly advanceable). Accordingly, the conditions 1 and 2 may be easily satisfied.

As described above, in the embodiment, the clearance is formed between the lower end of the connection member 2 and the fastened body H1 when the upper surface of the bolt head 12 abuts on the ceiling surface of the connection member hollow portion 21a (the connection member 2 becomes no longer threadly advanceable). As the clearance formed between the lower end of the connection member 2 and the fastened body H1 does not have to be visually confirmed for every axial force detection, the accurate axial force detection may be performed through the simplified method. In this embodiment, the upper surface of the bolt head 12 abuts on the ceiling surface of the connection member hollow portion 21a. However, the present invention is not limited to the example. It may be configured to form the clearance between the lower end of the connection member 2 and the fastened body H1 when other portion of the bolt 10 abuts on the connection member 2. For example, the concave or the convex portion formed on the upper surface of the bolt head 12 may be considered as the above-described other portion. This applies to the following embodiments.

Then a top end of the convex portion 22 of the connection member 2 is aligned with the lower end of the tension rod hollow portion 311. At this time, the tension bearer 4 is positioned above the fastened body H1 (in other words, the tension bearer 4 and the fastened body H1 are not in contact with each other). The handle 5 is then manually rotated around the rotation axis X to threadly engage the second female thread portion 311a and the second male thread portion 22a. Further rotation of the handle 5 allows the tension rod 31 to threadly advance downwardly together with the bearing 32 and the tension bearer 4. The tension bearer 4 is then seated on the fastened body H1.

FIG. 1 shows the state just after abutment of the tension bearer 4 on the fastened body H1. In this state, a clearance S1 is formed between the lower end of the tension rod 31 and the upper end of the column portion 21. A clearance S2 larger than the clearance S1 is formed between the top end of the convex portion 22 and the upper end of the tension rod hollow portion 311.

When the tension bearer 4 is seated on the fastened body H1, the tension rod 31 cannot be rotated any further because of small torque generated by the manually operated handle 5. The manually operated wrench 34 allows further rotation of the tension rod 31. This allows the connection member 2 to move up while being kept unrotatable.

As the connection member 2 moves up, downward pressing force is applied to the tension bearer 4 from the large-diameter rod portion 31b via the bearing 32. Since the tension bearer 4 seated on the fastened body H1 cannot move down, it is clamped between the bearing 32 and the fastened body H1 which, in turn, applies reaction force to the tension bearer 4. At this time, the strain gauge outputs the electrical signal (voltage, for example), based on which the axial force may be calculated. The calculated axial force may be displayed on a not shown display unit formed on the outer circumferential surface of the wrench 34 or the tension bearer 4, for example. The clearance S2 larger than the clearance S1 is capable of preventing abutment of the convex portion 22 on the upper end of the tension rod hollow portion 311 before abutment of the column portion 21 on the small-diameter rod portion 31a. As the operation length sufficient to apply tension to the bolt 10 may be secured, the problem of incapability of axial force detection may be avoided.

Second Embodiment

Figure 3:
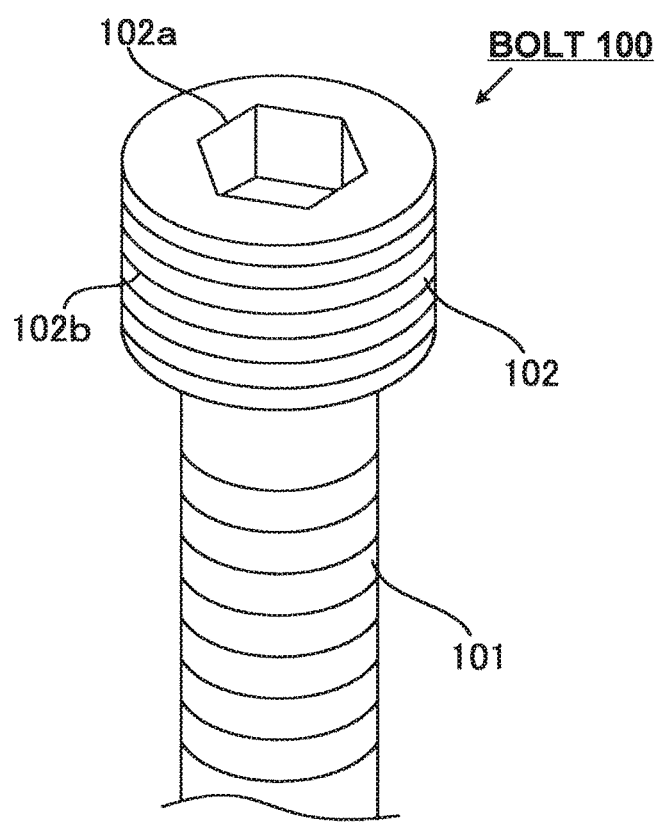
FIG. 3 is a perspective view of a bolt (second embodiment).

A second embodiment will be described referring to FIG. 3. In this embodiment, the type of the bolt is different from that of the bolt as described in the first embodiment. Otherwise, this embodiment is similar to the first embodiment, and detailed explanations thereof, thus will be omitted.

A bolt 100 as a hexagon socket bolt includes a bolt shaft 101 and a bolt head 102. A male thread portion is formed on the bolt shaft 101. The bolt 100 which has been inserted into the bolt hole H1a is threadly engaged with the bolt hole H2a so that the bolt 100 is fastened to the fastened member H.

Alternatively, the bolt 100 may be fastened to the fastened member H in the following manner. That is, the bolt 100 is inserted into the bolt hole H1a and the bolt hole H2a which has no female thread portion formed thereon so that a not shown nut is threadly engaged with the bolt shaft 101 downwardly extending from the end surface of the fastened member H (H2).

A hexagonal hole 102a is formed in a top surface of the bolt head 102. A not shown hexagonal wrench or the like is inserted into the hexagonal hole 102a for rotation around the rotation axis X so that the bolt 100 is fastened to the fastened member H. A first male thread portion 102b is continuously formed on the side surface of the bolt head 102 in the circumferential direction. The axial force may be detected in the state where the first male thread portion 102b of the bolt head 102 is threadly engaged with the first female thread portion 21a1 of the connection member 2.

In the illustrated example, the first male thread portion 102b is formed entirely across the side surface of the bolt head 102 from the upper end to the lower head. However, the present invention is not limited to the example. It is possible to form the first male thread portion on a part of the side surface from the upper end to the lower end as shown in FIG. 2(b) of the first embodiment.

The similar effects derived from the use of the bolt 10 of the first embodiment may be obtained by the use of the bolt 100 of this embodiment.

Third Embodiment

Figure 4:
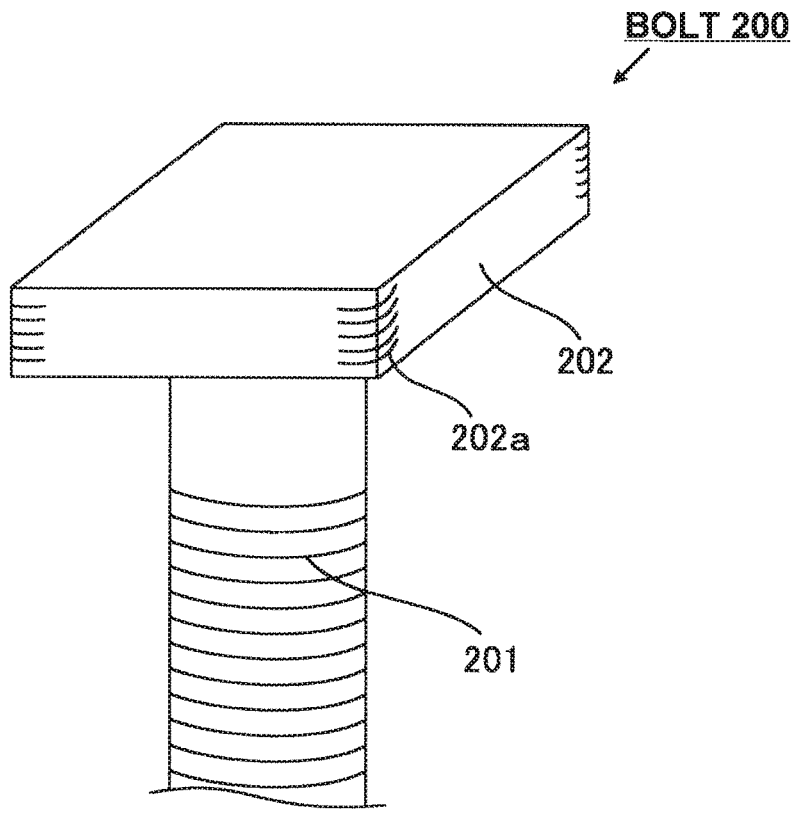
FIG. 4 is a perspective view of a bolt (third embodiment).

A third embodiment will be described referring to FIG. 4. In this embodiment, the type of the bolt is different from that of the bolt as described in the first and the second embodiments. Otherwise, the embodiment is similar to the first embodiment, and detailed explanations thereof, thus will be omitted.

A bolt 200 as a square head bolt includes a bolt shaft 201 and a bolt head 202. A male thread portion is formed on the bolt shaft 201. The bolt 200 which has been inserted into the bolt hole H1a is threadly engaged with the bolt hole H2a so that the bolt 200 is fastened to the fastened member H.

Alternatively, the bolt 200 may be fastened to the fastened member H in the following manner. That is, the bolt 200 is inserted into the bolt hole H1a and the bolt hole H2a which has no female thread portion formed thereon so that a not shown nut is threadly engaged with the bolt shaft 201 downwardly extending from the end surface of the fastened member H (H2).

First male thread portions 202a are formed on a side surface of the bolt head 202 in a circumferential direction at intervals. That is, each of the first male thread portions 202a is formed into a bending shape portion on the side surface of the bolt head 202. The axial force may be detected in the state where the first male thread portion 202a of the bolt head 202 is threadly engaged with the first female thread portion 21a1 of the connection member 2. In the illustrated example, the first male thread portion 202a is formed entirely across the side surface of the bolt head 202 from the upper end to the lower end. However, the present invention is not limited to the example. It is possible to form the first male thread portion on a part of the side surface from the upper end to the lower end as shown in FIG. 2(b) of the first embodiment.

Assuming that a width across flat of the bolt head 202 is defined as S, an "outer diameter of a male thread" of the first male thread portion 202a of the bolt head 202 is defined as D1, and a "bottom diameter of a male thread" of the first male thread portion 202a of the bolt head 202 is defined as D2, it is preferable to satisfy the following relational expressions (3) and/or (4).

$$D1 > S \times 1.03 \tag{3}$$

$$D2 < S \times 1.32 \tag{4}$$

By satisfying the relational expression (3), engagement of the fastening tool with the bolt head 202 may be improved when fastening the bolt 200 to the fastened member H. By satisfying the relational expression (4), engagement of the first male thread portion 202a with the first female thread portion 21a1 of the connection member 2 may be improved when tensioning the bolt 200 with the connection member 2.

Fourth Embodiment

Figure 5A:
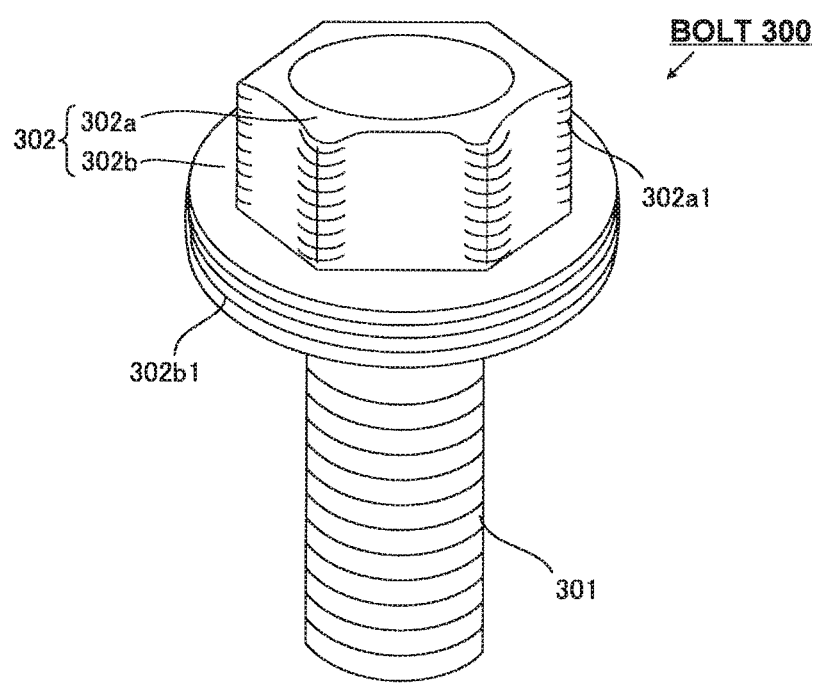
FIG. 5(a) is a perspective view of a bolt (fourth embodiment).
Figure 6:
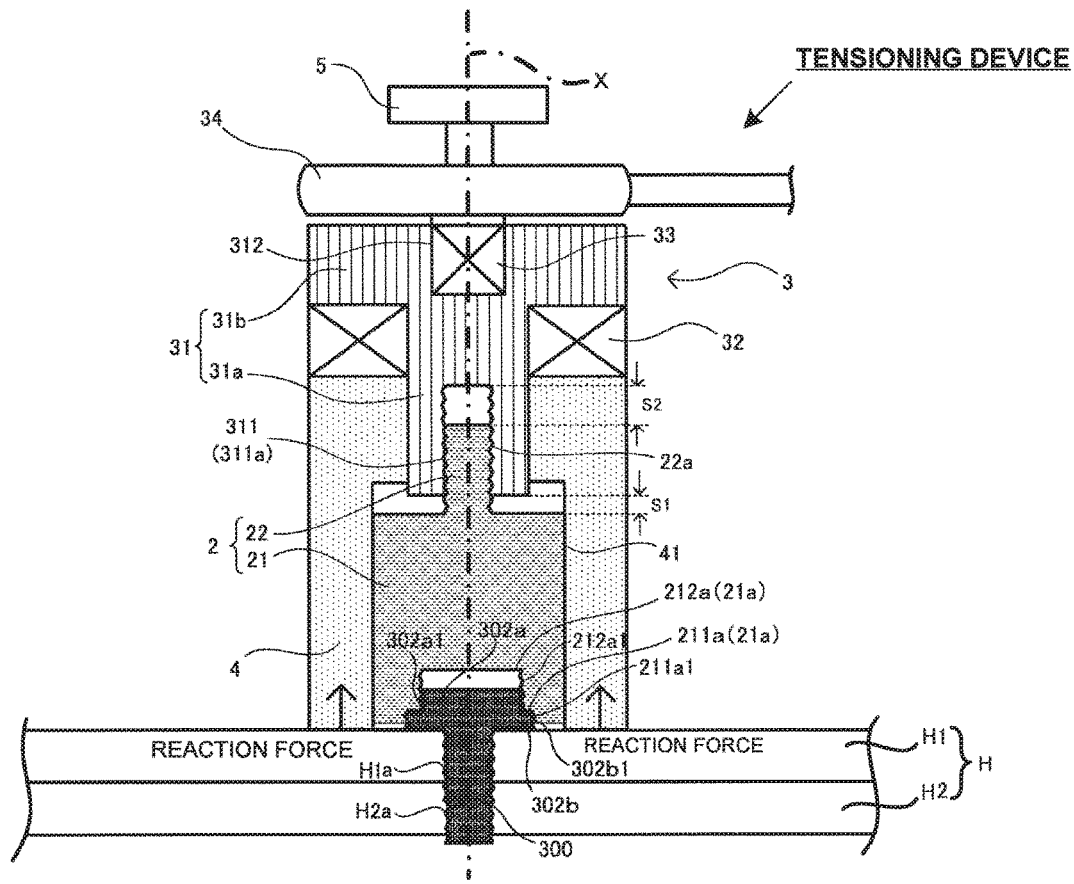
FIG. 6 is a schematic view of a tensioning device (fourth embodiment).

A fourth embodiment will be described referring to FIG. 5(a) and FIG. 6. In this embodiment, a flange bolt is used instead of the bolt as described in the first embodiment to the third embodiment. FIG. 5(a) is a perspective view of the flange bolt. FIG. 6 is a schematic view of the tensioning device.

The connection member hollow portion 21a has a vertical two-stage structure constituted by a large-diameter hollow portion 211a and a small-diameter hollow portion 212a. An upper end of the large-diameter hollow portion 211a is connected to a lower end of the small-diameter hollow portion 212a. A female thread portion 211a1 is formed on an inner circumferential surface of the large-diameter hollow portion 211a, and a female thread portion 212a1 (corresponding to the first female thread portion) is formed on an inner circumferential surface of the small-diameter hollow portion 212a.

A bolt 300 is a flanged hexagon head bolt as an example of the flange bolt, and includes a bolt shaft 301 and a bolt head 302. The bolt shaft 301 has a male thread portion formed thereon. The bolt 300 may be fastened to the fastened member H by threadly engaging the bolt 300 which has been inserted into the bolt hole H1a with the bolt hole H2a.

The bolt head 302 includes a head main body 302a and a flange 302b. The head main body 302a and the flange 302b are integrally formed. The flange 302b has a flat shape, projecting radially and outwardly from the head main body 302a. Circumferentially extending first male thread portions 302a1 are formed on an outer circumferential surface of the head main body 302a at intervals. A circumferentially extending first male thread portion 302b1 is continuously formed on an outer circumferential surface of the flange 302b. It is also possible to replace the bolt head 302 with the bolt head of the hexagon socket bolt as shown in FIG. 3.

The axial force may be detected in the state where the first male thread portion 302a1 is threadly engaged with the female thread portion 212a1, and the first male thread portion 302b1 is threadly engaged with the female thread portion 211a1. Each of the first male thread portions 302a1 and 302b1 is required to have the same pitch. Otherwise, the first male thread portions 302a1 and 302b1 cannot be threadly engaged with the connection member 2.

When the connection member 2 is rotated around the rotation axis X so as to threadly engage the first male thread portion 302a1 and the first male thread portion 302b1 with the female thread portion 212a1 and the female thread portion 211a1, respectively for connection between the connection member 2 and the bolt 300, the connection member 2 will threadly advance downwardly. Further rotation of the connection member 2 around the rotation axis X brings the upper surface of the flange 302b into abutment on the ceiling surface of the large-diameter hollow portion 211a to make the connection member 2 unrotatable. The embodiment may be configured to form a clearance between the lower end of the connection member 2 and the fastened body H1 in abutment of the flange 302b on the large-diameter hollow portion 211a (in other words, when the connection member 2 becomes no longer threadly advanceable). As the clearance formed between the lower end of the connection member 2 and the fastened body H1 does not have to be visually confirmed for every axial force detection, the accurate axial force detection may be performed through the simplified method. The upper surface of the flange 302b may include the concave or the convex portion formed thereon. That is, the embodiment may further be configured to form the clearance between the connection member 2 and the fastened body H1 in abutment on the concave or the convex portion.

First Modified Example of Fourth Embodiment

The embodiment is configured to form the clearance when the flange 302b abuts on the large-diameter hollow portion 211a. However, the present invention is not limited to the example, but applicable to the structure in which the clearance is formed when the upper surface of the head main body 302a abuts on the connection member hollow portion 21a. The upper surface of the head main body 302a may include the concave or the convex portion formed thereon. That is, the embodiment may be configured to form the clearance between the connection member 2 and the fastened body H1 in abutment on the concave or the convex portion.

Second Modified Example of Fourth Embodiment

In this embodiment, both the head main body 302a and the flange 302b have male thread portions. However, the present invention is not limited to the example, but applicable to the flange bolt having the male thread portion formed on only one of the head main body 302a and the flange 302b, and having no male thread portion formed on the other. In the illustrated example, the first male thread portion 302a1 is formed entirely across the side surface of the head main body 302a from the upper end to the lower end. However, the present invention is not limited to the example, but applicable to the structure having the first male thread portion formed on a part of the side surface from the upper end to the lower end as shown in FIG. 2(b) of the first embodiment. In the illustrated example, the first male thread portion 302b1 is formed entirely across the side surface of the flange 302b from the upper end to the lower end. However, the present invention is not limited to the example, but applicable to the structure having the first male thread portion formed on a part of the side surface from the upper end to the lower end as shown in FIG. 2(b) of the first embodiment.

It is clearly understood that the relational expressions (1) and/or (2) as described in the first embodiment are applicable to the head main body 302a of this embodiment.

Third Modified Example of Fourth Embodiment

Figure 5B:
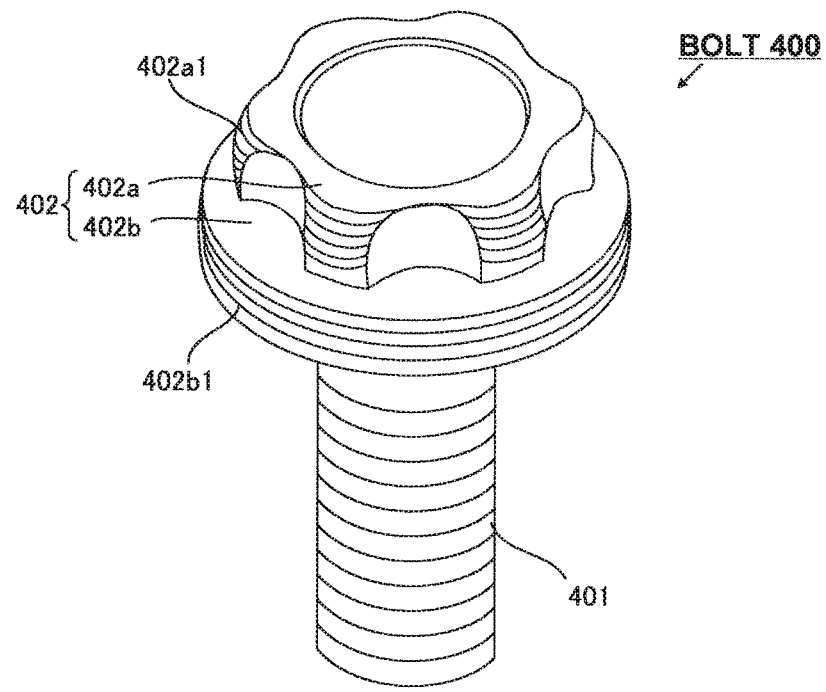
FIG. 5(b) is a perspective view of a bolt (modified example of the fourth embodiment).

The present invention is applicable to a flange bolt (see FIG. 5(b)) having the curved line of the bending shape portion gently formed compared with the flanged hexagon head bolt. Reference signs 400, 401, 402, 402a, 402b, 402a1, and 402b1 shown in FIG. 5(b) correspond to the reference signs 300, 301, 302, 302a, 302b, 302a1, and 302b1 shown in FIG. 5(a), respectively, and detailed explanations thereof, thus will be omitted.

Fourth Modified Example of Fourth Embodiment

Figure 7A:
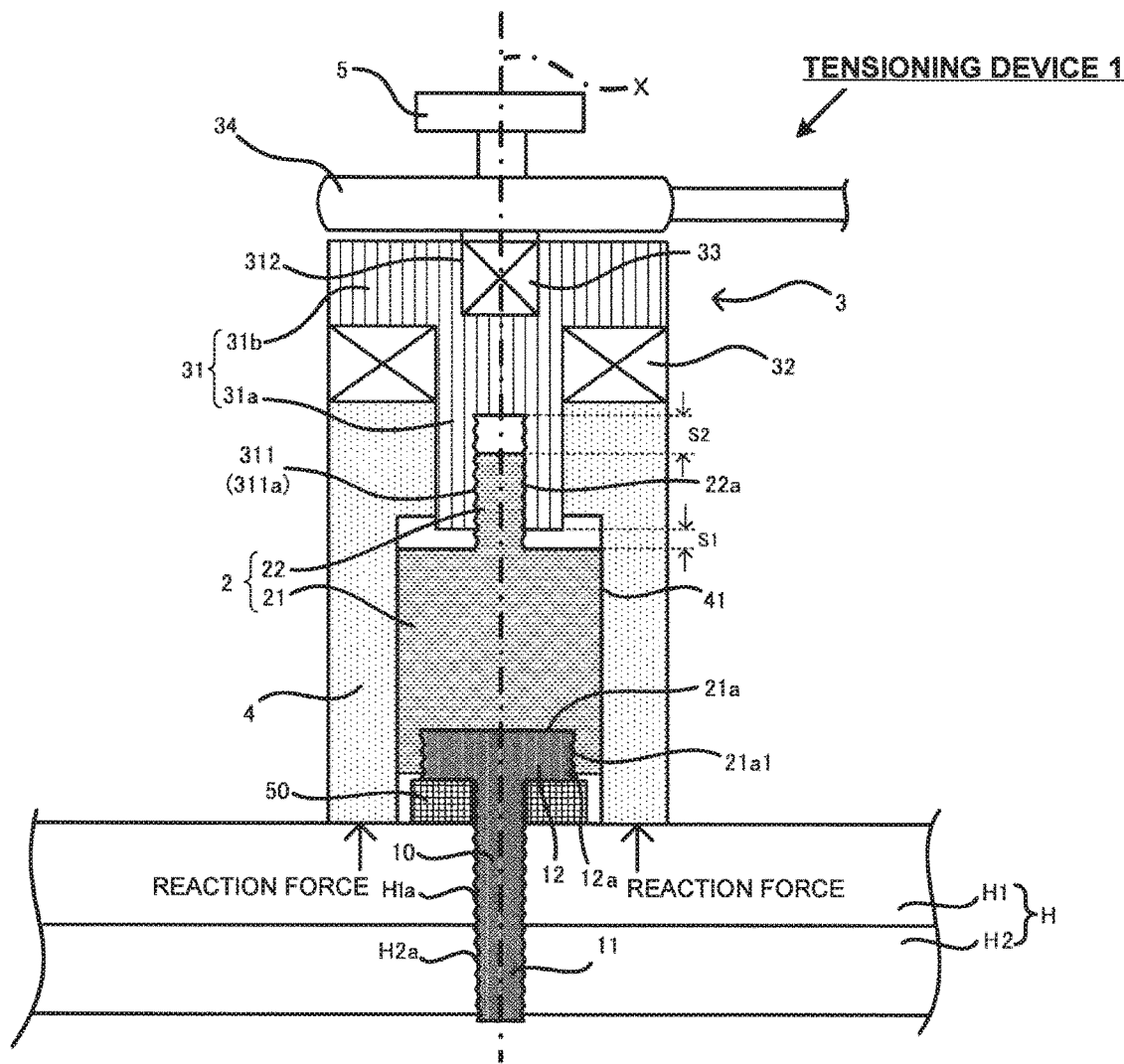
FIG. 7(a) is a schematic view of a tensioning device (fifth embodiment).

In the fourth embodiment, the flange 302b of the bolt head 302 has a flat shape. However, the present invention is not limited to the example, but applicable to the one with the curved surface as shown in FIG. 7(c) to be described later, or the one formed into a frustum shape. It may be configured to form the clearance between the connection member 2 and the fastened body H1 when the curved surface of the flange 302b (tapered surface if the flange 302b has the frustum shape) abuts on the large-diameter hollow portion 211a. The above-described curved surface (or the tapered surface) may include the concave or the convex portion formed thereon. That is, it may be configured to form the clearance between the connection member 2 and the fastened body H1 in abutment on the concave or the convex portion.

Fifth Embodiment

A fifth embodiment will be described referring to FIG. 7(a). FIG. 7(a) corresponding to FIG. 1 represents the state just after abutment of the tension bearer 4 on the fastened body H1. In this embodiment, a washer 50 intervenes between the bolt head 12 and the fastened body H1. The washer 50 is a generally employed flat washer formed into the flat shape, and has its diameter dimension set to be smaller than the inner diameter of the tension hollow portion 41. A very small clearance is formed between the lower end of the connection member 2 and the washer 50. Upon the axial force detection in the pressure contact state between the lower end of the connection member 2 and the washer 50, the detection error is aggravated. That is, the detection error may be reduced by performing the axial force detection while leaving the very small clearance between the lower end of the connection member 2 and the washer 50.

First Modified Example of Fifth Embodiment

The above-described embodiment is configured to form the clearance when the bolt head 12 abuts on the connection member hollow portion 21a. However, the present invention is not limited to the example. In the case where the connection member hollow portion 21a includes the large-diameter hollow portion 211a and the small-diameter hollow portion 212a as shown in FIG. 6, it may be configured to form the clearance between the connection member 2 and the fastened body H1 when the upper surface of the washer 50 abuts on the large-diameter hollow portion 211a. In this case, the axial force is detected while leaving the gap which has been formed in the vertical direction between the bolt head 12 and the small-diameter hollow portion 212a. The upper surface of the washer 50 may include the concave or the convex portion formed thereon. That is, it may be configured to form the clearance between the connection member 2 and the fastened body H1 in abutment on the concave or the convex portion.

Second Modified Example of Fifth Embodiment

Figure 7B:
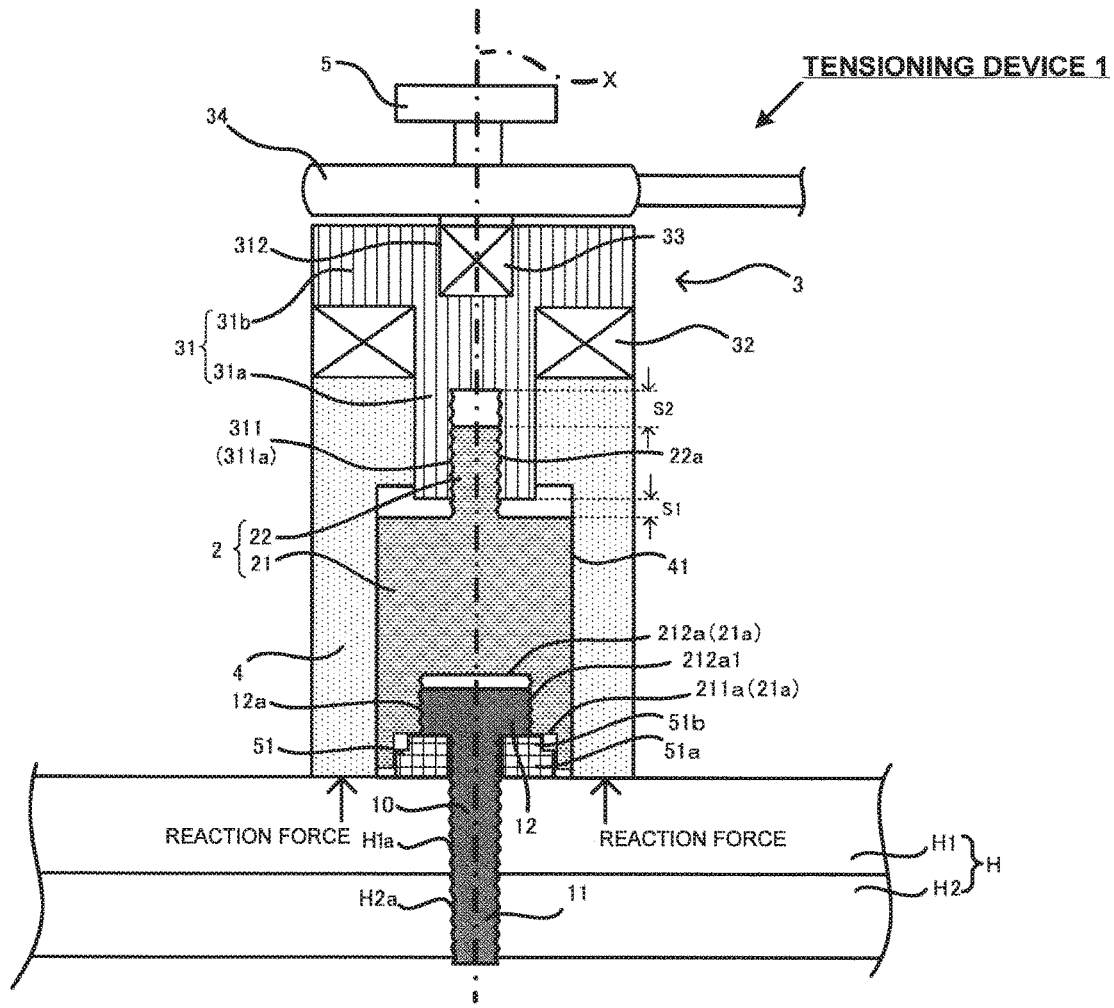
FIG. 7(b) is a schematic view of a tensioning device (second modified example of the fifth embodiment).
Figure 7C:
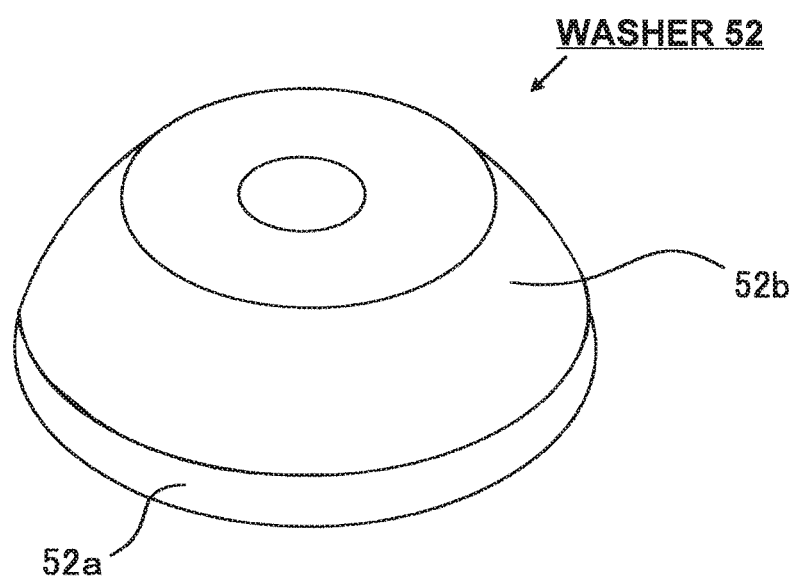
FIG. 7(c) is a perspective view of a washer (third modified example of the fifth embodiment).

FIG. 7(b) is a schematic view of a tensioning device of the modified example, and represents the state just after abutment of the tension bearer 4 on the fastened body H1. The connection member hollow portion 21a has a two-stage structure constituted by the large-diameter hollow portion 211a and the small-diameter hollow portion 212a. The upper end of the large-diameter hollow portion 211a is connected to the lower end of the small-diameter hollow portion 212a. The female thread portion 212a1 is formed on the inner circumferential surface of the small-diameter hollow portion 212a.

A washer 51 as a stepped washer includes a large-diameter washer portion 51a and a small-diameter washer portion 51b formed on the upper surface of the large-diameter washer portion 51a. The large-diameter washer portion 51a is integrally formed with the small-diameter washer portion 51b, and has its diameter dimension larger than that of the small-diameter washer portion 51b. The small-diameter washer portion 51b has the outer diameter dimension larger than that of the bolt head 12.

When the connection member 2 is rotated around the rotation axis X so as to threadly engage the first male thread portion 12a of the bolt head 12 with the female thread portion 212a1 of the small-diameter hollow portion 212a, the connection member 2 will threadly advance downwardly. Further rotation of the connection member 2 around the rotation axis X brings the upper surface of the small-diameter washer portion 51b into abutment on the large-diameter hollow portion 211a to make the connection member 2 unrotatable. The embodiment is configured to form a clearance between the connection member 2 and the fastened body H1 in abutment of the small-diameter washer portion 51b on the large-diameter hollow portion 211a (in other words, when the connection member 2 becomes no longer threadly advanceable). As the clearance formed between the lower end of the connection member 2 and the fastened body H1 does not have to be visually confirmed for every axial force detection, the accurate axial force detection may be performed through the simplified method. The upper surface of the small-diameter washer portion 51b may include the concave or the convex portion formed thereon. That is, it may further be configured to form the clearance between the connection member 2 and the fastened body H1 in abutment on the concave or the convex portion.

Even in the case of using the stepped washer 51, it may be configured to form the clearance between the connection member 2 and the fastened body H1 when the bolt head 12 abuts on the connection member hollow portion 21a. It may also be configured to form the clearance between the connection member 2 and the fastened body H1 when the upper surface of the large-diameter washer portion 51a abuts on the connection member hollow portion 21a. The upper surface of the large-diameter washer portion 51a may include the concave or the convex portion formed thereon. That is, it may be configured to form the clearance between the connection member 2 and the fastened body H1 in abutment on the concave or the convex portion.

Third Modified Example of Fifth Embodiment

In the above-described embodiment, the washer 50 is formed into a flat shape. However, the present invention is not limited to the example. FIG. 7(c) is a perspective view of a washer 52 according to the modified example. The washer 52 is a rosette washer, having an upwardly extending dome-like curved surface portion 52b formed on a lower end flat portion 52a. The modified example may be configured to form the clearance between the connection member 2 and the fastened body H1 when the curved surface portion 52b of the washer 52 abuts on the large-diameter hollow portion 211a. It may be configured to form the clearance between the connection member 2 and the fastened body H1 in abutment on the concave or the convex portion formed on the curved surface portion 52b, if any. The washer 52 may be formed to have the frustum shape. In this case, it may be configured to form the clearance between the connection member 2 and the fastened body H1 when the tapered surface of the washer 52 abuts on the large-diameter hollow portion 211a. It may also be configured to form the clearance between the connection member 2 and the fastened body H1 in abutment on the concave or the convex portion formed on the tapered surface, if any. Likewise the fifth embodiment, it may be configured to form the clearance when the bolt head 12 abuts on the connection member hollow portion 21a.

Sixth Embodiment

Figure 8:
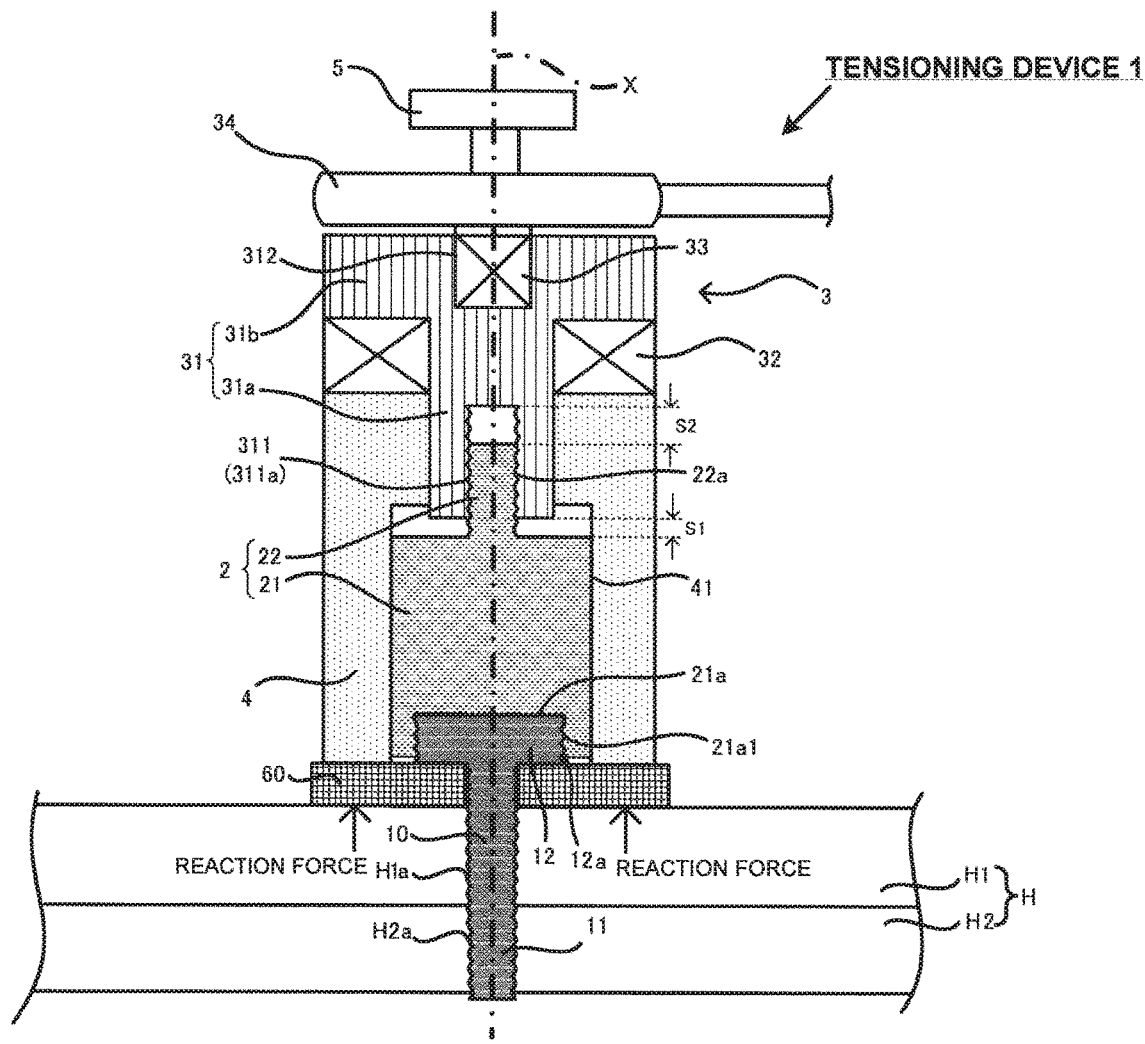
FIG. 8 is a schematic view of a tensioning device (sixth embodiment).

A sixth embodiment will be described referring to FIG. 8. FIG. 8 represents the state just after abutment of the tension bearer 4 on a protection plate 60. That is, the protection plate 60 may be intervened between the bolt head 12 and the tension bearer 4, and the fastened body H1. The protection plate 60 has an opening through which the bolt shaft 11 is inserted, and a diameter dimension larger than the outer diameter of the tension bearer 4. When rotating the handle 5 to move down the tension bearer 4, the tension bearer 4 abuts on the protection plate 60 instead of the fastened body H1. In this case, the reaction force applied from the fastened body H1 is transmitted to the tension bearer 4 via the protection plate 60.

This embodiment is especially preferable to the case where rigidity (EI) and resilient limit strength of the fastened member H are lower than those of the tension bearer 4. The "E" denotes Young's modulus, and "I" denotes the cross-sectional secondary moment. Specifically, upon detection of the axial force by abutting the tension bearer 4 on the fastened body H1, the load is concentratedly exerted to the abutment part of the fastened body H1. In the above-described case, the low rigidity of the fastened body H1 may cause the risk of deformation thereof. The embodiment employs the protection plate 60 with the diameter dimension larger than the outer diameter of the tension bearer 4, which is interposed between the tension bearer 4 and the fastened body H1 so that the abutment area is increased to distribute the load, resulting in reduced load exerted to the fastened member H.

The protection plate 60 may be made of the material (heat treated steel material, for example) with higher rigidity (EI) and higher resilient limit strength than those of the fastened member H. Detection of the reaction force via the protection plate 60 with higher rigidity (EI) may reduce detection error of the axial force detection.

A very small clearance is formed between the lower end of the connection member 2 and the protection plate 60. As the effect derived from the thus formed very small clearance is similar to the effect of the fifth embodiment, detailed explanations of such effect will be omitted.

First Modified Example of Sixth Embodiment

Figure 9:
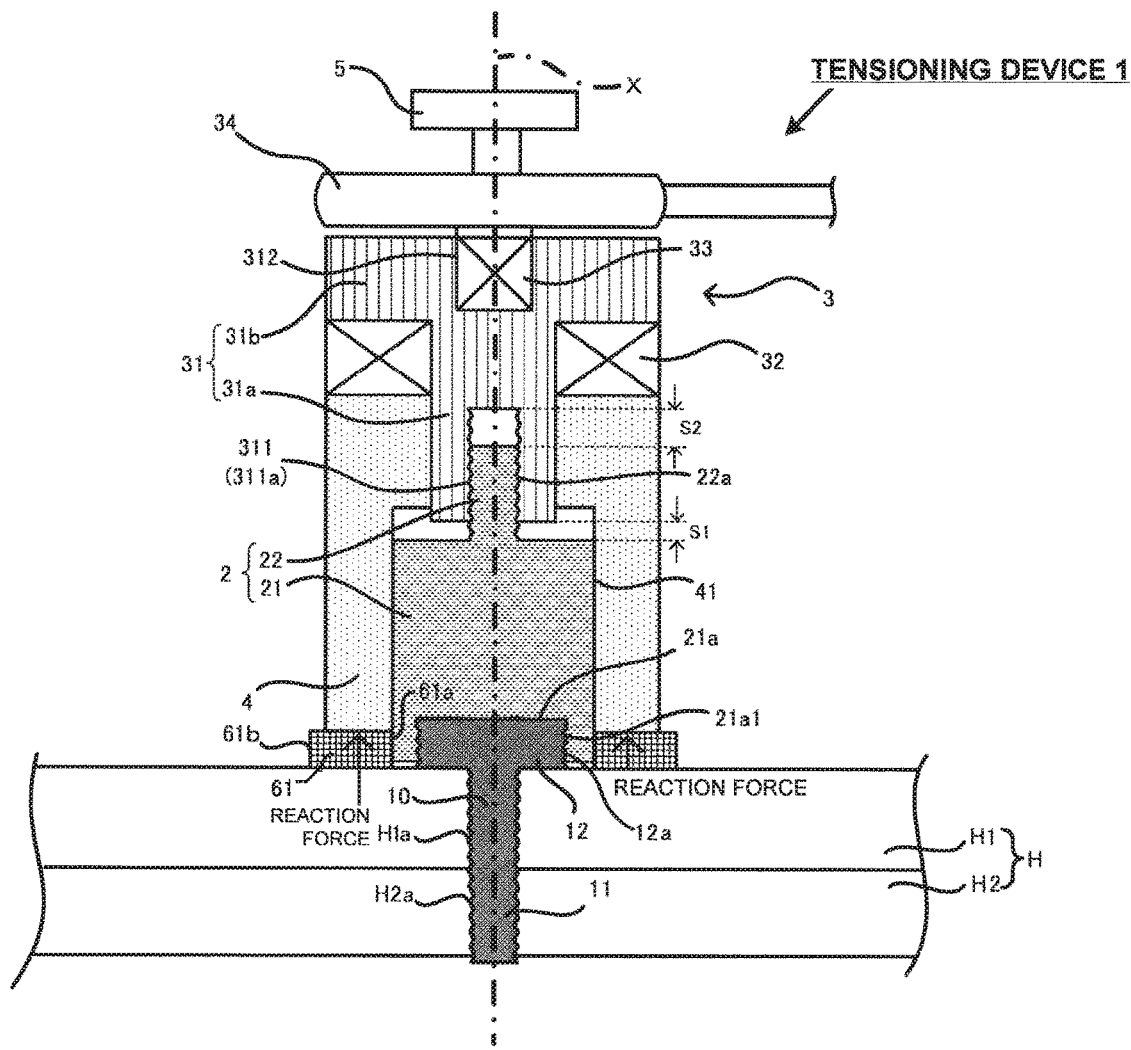
FIG. 9 is a schematic view of a tensioning device (modified example of the sixth embodiment).

FIG. 9 shows a modified example of the protection plate. A protection plate 61 formed to have a ring-like shape (an arbitrary shape other than the ring-like shape is available) is intervened between the tension bearer 4 and the fastened body H1 so as not to be located just below the bolt head 12. The protection plate 61 has an inner edge portion 61a at a position corresponding to the inner edge portion of the tension bearer 4, and an outer edge portion 61b at a position radially protruding from the outer edge portion of the tension bearer 4. The similar advantageous effects to those of the sixth embodiment may be derived from the example. In this example, adjustment of the thickness of the protection plate 61 in the radial direction may substantially equalize a deformation amount of the fastened body H1 just below the bolt head 12 to that of the fastened body H1 just below the protection plate 61. Specifically, assuming that the deformation amount of the fastened body H1 just below the bolt head 12 before starting tensioning by the tensioning mechanism 3 is S1, and the deformation amount of the fastened body H1 just below the protection plate 61 after starting tensioning by the tensioning mechanism 3 is S2, it is preferable to preliminarily adjust the area of the protection plate 61 in contact with the fastened body H1 so that the deformation amounts S1 and S2 are substantially equalized. Each of the deformation amounts S1 and S2 refers to the deformation amount of the bolt 10 in the axial direction. The protection plate 61 may be provided as a part of the tension bearer 4. In this case, it is preferable to adjust the contact area of the abutment part (in other words, the lower end) of the tension bearer 4 in contact with the fastened body H1 to satisfy the above-described condition. The appropriate contact area may be obtained through preliminary experiment or simulation.

An explanation will be made about advantageous effects derived from substantially equalizing the deformation amounts. Tensioning the bolt head 12 will release the deformation amount of the fastened body H1 just below the bolt head 12 in tightening (in other words, the part just below the bolt head 12 becomes nearly in the no-load state). In order to retain the deformed state resulting from tensioning the bolt head 12, the fastened body H1 is deformed with the protection plate 61 (or tension bearer 4) likewise the tightened state so as to improve the axial force detection accuracy. It is clearly understood that the structures of the sixth embodiment and the first modified example thereof are applicable to other embodiments and other modified examples.

Seventh Embodiment

In the above-described embodiment and the modified example thereof, the bolt head shape is hexagonal. However, the present invention is not limited to the example. For instance, it is possible to use the square head bolt or the dodecagon head bolt instead of the hexagon head bolt. It is possible to form the first male thread portion on the bending shape portion of the outer circumferential surface of the bolt head of type as described above. Those bolts may be flanged or flangeless. As the dodecagon head bolt includes more threadly engageable ridges than those of the hexagon head bolt or the square head bolt, the tensioning may be stably performed. It is therefore possible to improve the tensile strength while improving the axial force detection accuracy. Assuming that the width across flat of the dodecagon bolt head, the outer diameter of the male thread of the first male thread portion, and the bottom diameter of the male thread of the first male thread portion are defined as S, D1, and D2, respectively, it is preferable to satisfy the following relational expressions (5) and/or (6).

$$D1 > S \times 1.04 \quad (5)$$

$$D2 < S \times 1.13 \quad (6)$$

By satisfying the relational expression (5), the engagement of the fastening tool with the bolt to be fastened may be improved. By satisfying the relational expression (6), the engagement of the first male thread portion with the first female thread portion of the connection member 2 may be improved upon tensioning of the bolt with the connection member 2. As the dodecagon head bolt includes more threadly engageable ridges than those of the hexagon head bolt or the square head bolt, the tensioning may be stably performed. It is therefore possible to improve the tensile strength while improving the axial force detection accuracy.

Other Embodiment

The present invention is applicable to a double hexagon head bolt which is formed by vertically stacking two hexagonal head portions while being shifted each other by 30°. Each head portion may be provided with the first male thread portion similar to the one as described in the first embodiment. It is also possible to form the first male thread portion on only one of the vertically stacked head portions. The present embodiment allows easy operation to threadly engage the bolt with the connection member 2.

REFERENCE SIGNS LIST 1 tensioning device
2 connection member
3 tensioning mechanism
4 tension bearer
5 handle
10, 100, 200, 300 bolt
12a, 102b, 202a, 302a1, 302b1 first male thread portion
21 column portion
21a connection member hollow portion
21a1 first female thread portion
22 convex portion
22a second male thread portion
31 tension rod
31a small-diameter rod portion
31b large-diameter rod portion
32 bearing
33 angle drive
34 wrench
50 52 washer
60 protection plate 311 tension rod hollow portion
311a second female thread portion
H (H1, H2) fastened member

The invention claimed is:

1. A tensioning device which applies upward tension to a bolt fastened to a fastened member, having a first male thread portion formed on an outer circumferential surface of a head of the bolt, the tensioning device comprising:
   a connection member having a first female thread portion to be threadly engaged with the first male thread portion;
   a tensioning mechanism which tensions the bolt via the connection member while having the first male thread portion threadly engaged with the first female thread portion; and
   a tension bearer which is disposed around an outer circumference of the connection member, and bears a reaction force applied from the fastened member in tensioning performed by the tensioning mechanism.

2. The tensioning device according to claim 1, wherein:
   the tensioning mechanism includes a tension rod, a bearing which rotatably supports the tension rod around a vertically extending shaft portion, and a rotation mechanism serving to rotate the tension rod around the shaft portion;
   a convex portion having a second male thread portion formed on an outer circumferential surface is disposed on an upper end of the contact member; and
   a hollow portion having a second female thread portion to be threadly engaged with the second male thread portion on an inner circumferential surface is formed in a lower end of the tension rod.

3. The tensioning device according to claim 2, wherein the tension bearer is vertically interposed between the bearing and the fastened member.

4. The tensioning device according to claim 2, wherein the convex portion has an axial diameter which is substantially the same as that of the bolt, and a friction torque reducing agent for reducing a friction torque is applied to the second male thread portion and the second female thread portion.

5. The tensioning device according to claim 1, wherein a tensile strength of the connection member is higher than that of the bolt.

6. The tensioning device according to claim 1, wherein the bolt is a hexagon head bolt, having the first male thread portion formed on a bending shape portion of an outer circumferential surface of a head of the bolt.

7. The tensioning device according to claim 6, wherein the following relational expressions (1) and/or (2) are satisfied:

$$D1 > S \times 1.03 \quad (1)$$

$$D2 < S \times 1.10 \quad (2)$$

where S denotes a width across flat of a head of the bolt, D1 denotes an outer diameter of a male thread of the first male thread portion, and D2 denotes a bottom diameter of a male thread of the first male thread portion.

8. The tensioning device according to claim 1, wherein the bolt is a hexagon socket bolt, having the first male thread portion continuously formed on an outer circumferential surface of a head of the bolt.

9. The tensioning device according to claim 1, wherein the bolt is a square head bolt, having the first male thread portion formed on a bending shape portion of an outer circumferential surface of a head of the bolt.

10. The tensioning device according to claim 9, wherein the following relational expressions (3) and/or (4) are satisfied:

$$D1 > S \times 1.03 \quad (3)$$

$$D2 < S \times 1.32 \quad (4)$$

where S denotes a width across flat of a head of the bolt, D1 denotes an outer diameter of a male thread of the first male thread portion, and D2 denotes a bottom diameter of a male thread of the first male thread portion.

11. The tensioning device according to claim 1, wherein:
   the bolt is a flange bolt having a bolt head including a head main body and a flange; and
   the first male thread portion is formed on at least one of the head main body and the flange.

* * * * *